United States Patent [19]

Morse et al.

[11] Patent Number: 4,475,477

[45] Date of Patent: Oct. 9, 1984

[54] STENCIL APPARATUS

[75] Inventors: Albert I. Morse, Beverly; Robert C. Simmonds, Jr., Topsfield, both of Mass.

[73] Assignee: USM Corporation, Farmington, Conn.

[21] Appl. No.: 451,918

[22] Filed: Dec. 27, 1982

[51] Int. Cl.³ .............................................. B05C 3/00
[52] U.S. Cl. .................................. 118/406; 118/202; 118/263; 427/197; 427/282
[58] Field of Search .......................... 12/12.41, 12.21; 427/197, 282, 256, 208.2; 118/406, 50, 50.1, 202, 263; 101/41, 129, 114

[56] References Cited

U.S. PATENT DOCUMENTS

| | | | |
|---|---|---|---|
| 839,187 | 12/1906 | Norton | 427/197 |
| 3,658,977 | 4/1972 | Baker | 427/282 X |

Primary Examiner—Shrive P. Beck
Attorney, Agent, or Firm—Donald N. Halgren

[57] ABSTRACT

A powder deposition apparatus comprising a stencil means having an upper non-permeable surface, with a cut-out therethrough is adapted on top of a screen, and a lowermost foil surface with a similar aligned cut-out therethrough which apparatus is articulatable over a receiving surface. The apparatus also comprises a gasket which is secured to the lowermost foil side of the screen, around at least a portion of the cut-out. The gasket may be of uniform thickness along its entire length or of tapering thickness at its end portions. The deposition apparatus permits a configuration of powder to be applied to the receiving surface in a three-dimensional configuration, the gasket acting as a retaining partition and a spacing means, to provide a desired configuration (height/taper, breadth, and width) of a product, for subsequent application after proper heating and fusing, to a substrate, preferably to the inner side of a shoe upper to which the fused powder would adhere and act as a reinforcement or decorative member.

14 Claims, 3 Drawing Figures

U.S. Patent  Oct. 9, 1984  Sheet 1 of 2  4,475,477
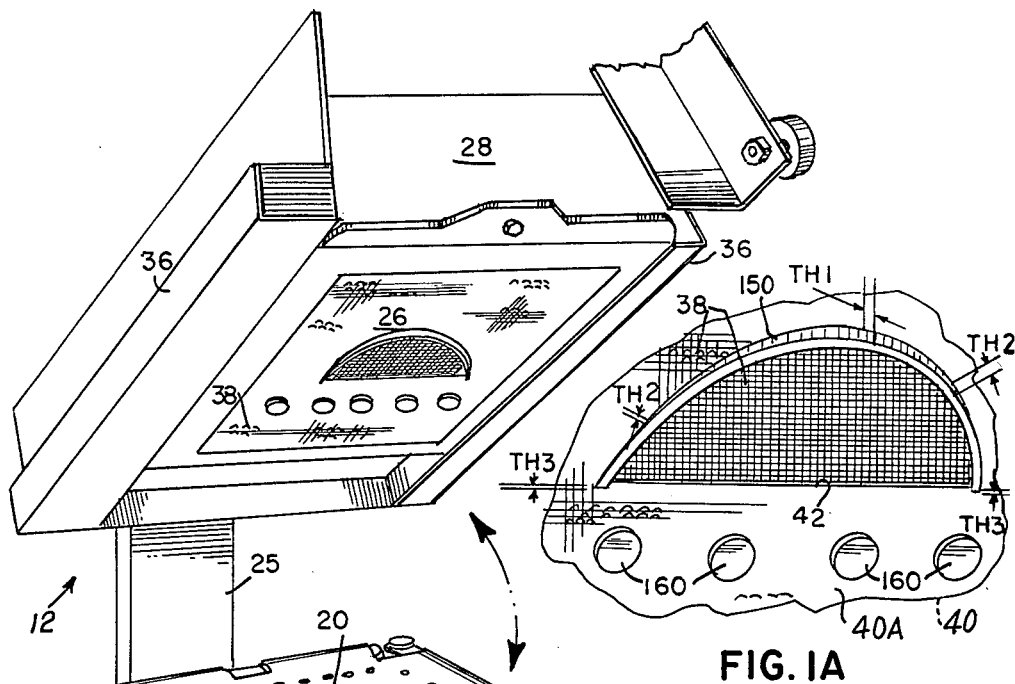
FIG. IA
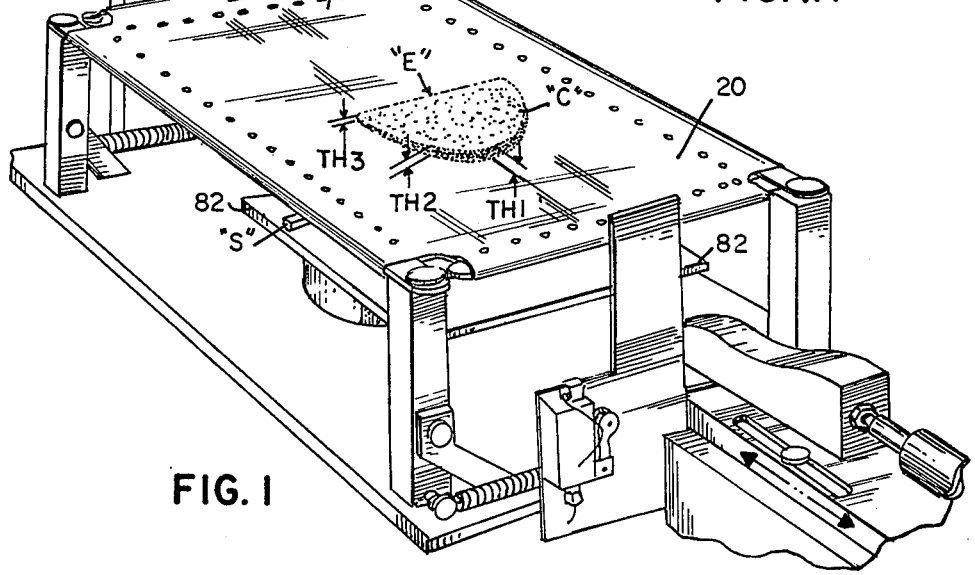
FIG. I

STENCIL APPARATUS

BACKGROUND OF THE INVENTION

(1) Field of the Invention

This invention relates to an apparatus for depositing a configuration of a fusible powder on a reveiving surface for subsequent application to a substrate to change certain reinforcement/stiffening or decorative characteristics of that substrate, and more particularly to an apparatus for producing reinforcing or decorative means for application to shoe uppers prior to their assembly on a shoe last.

(2) Prior Art

The shoe and apparel industry have for many years years provided reinforcement/stiffening or decorative means to their products. Manufactures of pajamas, blue jeans, sports clothing, including sports equipment such as gloves, caps with visors, and the like, as well as shoe manufacturers hav stitched, glued or otherwise applied layers of reinforcing material to their products for a variety of reasons. It has been standard for the shoe industry to apply the reinforcement/stiffening or decorative means as a layer of molten thermoplastic material adherable to a shoe upper. Early attempts at reinforcing or stiffening a shoe upper have included providing preformed stiffener elements or counters, which are inserted into a shoe upper, prior to lasting. Separate moldable sheet materials softenable by heating or by solvent have been inserted in the shoe uppers prior to lasting and are shaped in the course of lasting to a desired configuration which configuration they retain by being allowed to harden before removal of the shoe upper from the last. Shoe uppers have also been stiffened by impregnating a shoe component with a solution or dispersion in a volatile liquid vehicle of hardenable stiffener materials prior to lasting of the shoe upper, the shoe upper being stiffened by hardening of the impregnating material after the shoe is lasted.

One such way of stiffening shoe uppers is shown in U.S. Pat. No. 3,316,573 to Chaplick et al, wherein a shoe upper has a selected area in which a resiliently flexible stiffener element is fluidly deposited, and heated to a moldable point, and brought to a three-dimensional configuration which it will retain on cooling.

Another arrangement for coating shoe parts is shown in U.S. Pat. No. 3,342,624 to Kamborian, wherein a stencil plate rests upon a shoe upper, a concave support surface holds the combination, whereupon a doctor blade wipes across the plate to deposit a fluid stiffener into the depression in the shoe upper.

A more recent arrangement for stiffening shoe components, is shown in U.S. Pat. NO. 3,973,285 to Babson et al, comprising an arrangement for depositing a molten charge of thermoplastic on a shoe upper held in a margin clamping means.

The prior art arrangements may occasionally work well, but they also may leak their molten material out of conecting joints, the nozzles may drool, the patterns require time and patience to change, and the final reinforced surface may not be as smooth as desired because the discharge pattern of the nozzles may remain, even if the molten material is pressed after it has been applied or cools. The material usable in these prior art mechines are limited by their flow properties and heat stability characteristics, which necessitate careful tailoring to individual applications. Seams and overlaid patterns have also proved difficult for smooth application of the materials thereover, as well as being difficult in holding non-flat surfaces by the apparatus.

Thus it is an object of the present invention to provide a stencil apparatus which will overcome the shortcomings of the prior art.

It is a further object of the present invention to provide a mechanism for helping manufacture reinforcement/stiffening or decorative means in a desired configuration as an individual piece or as a part of a substrate such as a shoe upper or piece of cloth-type material, which configuration may be made from a wide choice of low cost polymeric materials having superior physical characteristics which may be readily changed to facilitate various shoe upper patterns or styles or reinforcement/stiffening or decorative requirements of the garment with conveniently made low cost stencil tooling.

It is yet a further object of the present invention, to provide a means which will permit the subsequent manufacture a smooth stiffened/reinforced shoe upper, without the inconveniences of the prior art.

BRIEF SUMMARY OF THE INVENTION

The present invention includes an apparatus for depositing a powder material in a three dimensional configuration onto a receiving surface for subsequent treatment and application to a substrate, which material is preferably a reinforcing and stiffening and/or decorative powder, adhereable to the underside of the shoe uppers. The apparatus comprises a deposition station. The deposition station has a horizontal receiving belt surface of rectangular configuration. The receiving belt is tensionably mounted on a frame which is movable into successive stations. The receiving belt acts as a support surface and comprises a thin metal screen or web of woven glass fibers coated with a low friction plastic heat resistant material. A deposition means including a template-like stencil means is hingedly disposed above the receiving belt. The stencil means comprises the lower surface of the deposition means comprising a container which may receive the reinforcing/stiffening and/or decorative material in powder form from a conduit secured to a supply hopper thereabove. The conduit may be arranged with a pair of blades supported on a dispenser-carriage movable across the container.

The stencil means, slidable received in the bottom of the container, is constructed from a wire mesh screen and an overlay of smooth impervious material and an underlay of thin foil-like material. The wire mesh screen has a mesh size large enough to permit the powder to pass therethrough. The powder is preferably of 35 mesh size when used for most shoe applications, but a finer mesh, i.e. from 50 mesh to 100 mesh may be required for more intricate design work. The powder is fusible by heating it at temperatures of about 375° F. to about 500° F. for up to about 25 seconds. The smooth impervious overlay material and the thin foil-like layer each will have at least one cut-out thereacross in alignment with one another, and in the overall shape of the desired configuration of the powdered material, which is, in the preferred embodiment, a fusible powdered reinforcement/stiffener or decorative means to be applied to a shoe upper or other substrate.

A perimeter spacing element or gasket is arranged about at least part of the cut-out on the bottom foil (screen) side of the stencil. The thickness of the end portions of the perimeter spacing element may be of tapering dimensions, and the middle portion thereof therefore may be of thicker dimensions, that is, the ends of the spacer element may taper down to a point viewed from the side, if a tapered product is desired. Other embodiments would include the peripheral gasket or partition being of uniform thickness for at least part of the periphery of the cut-out, or of uniform thickness for the entire periphery of the cut-out. The latter embodiment would be applicable for reinforcement/stiffening or decorative means of uniform thickness across its entire body.

A plurality of stand off elements may also be arranged on the bottom of the stencil, spaced from the cut-out. The stand off elements may be button-shaped members of a particular thickness, which members permit air to flow between the receiving surface and the foil on the bottom side of the screen of the stencil when the stencil is lifted from the receiving surface, without upsetting the powder thereon by vortices of inrushing air filling the vacuum which would otherwise occur.

The receiving belt, when disposed at the deposition station, has a lower support means thereunder movable upwardly and downwardly in respect thereto, to provide backing thereagainst during application of powder thereon, in the deposition process. The lower support means comprises a plate which may have a shim or configured partition thereon, which shim is utilizable to bias the receiving surface between the cut-out and any stand-off members when the stencil means has a partial peripheral gasket therearound, to produce a skive on the product for superior application as shoe upper reinforcements of the like, as shown and described in copending commonly assigned U.S. Pat. application Ser. No. 452,964 filed Dec. 29, 82 and entitled, "Linear Deposition Apparatus", by R. Simmonds et al.

In operation of the stencil apparatus, a quantity of fusible powder is receivable in the container from a dispenser-carriage which powder may be received from a supply hopper. Wiper blades may be caused to sweep across the lower surface of the container of the stencil apparatus, sweeping fusible powder into the configured cut-out thereacross, the receiving belt having been pushed by the lower support means thereunder into close fitting arrangement with the arrangement of spacer means and gasket around the cut-out on the bottom side of the stencil means. The receiving belt may thus have deposited thereon a three dimensional configuration of fusible powder thereon, the powder being applicable in a particular desired thicknes and/or taper because of the perimeter spacing element acts as a partition to hold (contain) the powder, and which causes the peripherally gasketed portion of the cut-out over the screen of the stencil to be spaced (held) away from the receiving belt, by whatever desired thickness, which thickness in the final product may taper because of the taper in thickness of the perimeter spacing element or gasket.

Upon receipt of a proper signal, the lower support and shim (if any), under the receiving belt is movable downwardly, and a pneumatically actuated cam may be caused to hit a cam follower and gradually raise the lower surface of the container and stencil means from being just above the receiving belt surface, thus freeing the three dimensional configuration of deposited powder from any contact with the stencil or its spacer means. The stencil means already being held upwardly and spaced from the receiving belt by the peripheral partition and the "button-like" stand-off elements eliminates the inrushing of air which would otherwise occur which would upset the configuration of powder on the receiving belt. To further process the configuration of powder after completion therewith by the stencil apparatus, a further proper signal may initiate pressure in shuttle means to cause the receiving belt and its cargo of configured powder to move to subsequent next work stations for appropriate heating/fusing and then cooling and pressing thereof preferably onto a surface application.

BRIEF DESCRIPTION OF THE DRAWINGS

The objects and advantages of the present invention will become more apparent when viewed in conjunction with the following drawings, in which:

FIG. 1 is a perspective view of a deposition apparatus constructed according to the principles of the present invention;

FIG. 1A is an enlarged partial perspective view of the cut-out shown in FIG. 1.

DESCRIPTION OF THE PREFERRED EMBODIMENT

Figure 2:
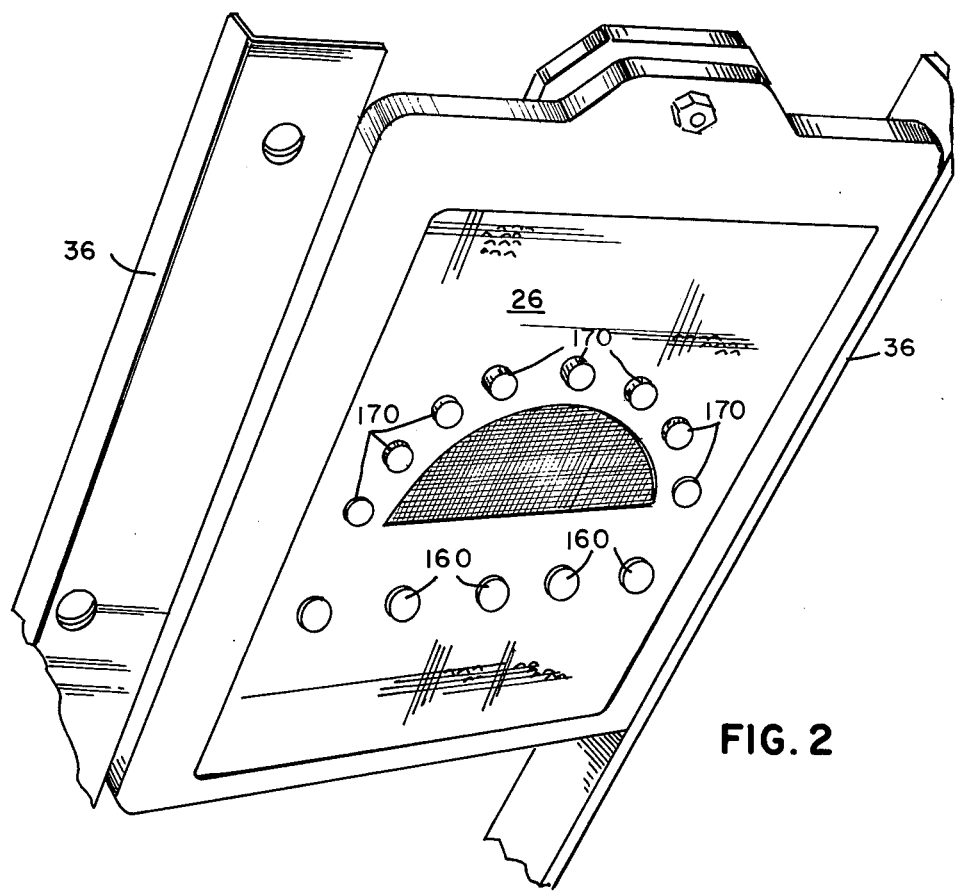
FIG. 2 is an alternative embodiment of the apparatus shown in FIG. 1.

Referring now to the drawing in detail and particularly to FIGS. 1 and 1A, there is shown an enlarged view of the stencil means 26, shown more generally in copending U.S. Pat. application Ser. No. 452,964 filed Dec. 29, 1982 and entitled Linear Deposition Apparatus by R. Simmonds et al, which is herein incorporated by reference.

The template-like stencil means 26 is part of deposition means 12, which is attached to support means 25 and is arranged over a receiving belt 20 as shown in the above-identified application. The stencil means 26, which comprises the lower surface of the screen frame 28, receives a powder material which powder may be swept across the bottom of the screen frame 28 by wiper blades articulated on a movable carriage. The powder material is typically but not limited to polymers such as ionomer, polyethylene, an ethylene vinyl acetate, polyvinyl chloride or nylon, typically in a size of 35 mesh for box toe applications or of 50 mesh to 100 mesh size when finer patterns and thinner products are desired.

The stencil means 26, retained in the channels 36, is comprised of a wire mesh screen 38 and an overlay of smooth stiff impervious plastic-like material 40, on top of the screen 38 and a thin metal foil 40A on the bottom side thereof, being able to stick to the screen 38 and to one another by an adhesive coating on their common side. Thus, the screen 38 is "sandwiched" between the two layers of imperivous material, each layer may have a pressure sensitive adhesive on their screen side to grip one another through the mesh in the screen 38 as well as to grip the screen 38. The smooth overlay of plastic-like material, and the underlay of foil on the bottom side, not the screen 38, has a cut-out 42 therethrough, which cut-out 42 is shown here by the generally semicircular shape in the figures. The screen 38 is of a mesh size which will permit the smooth flow of powder therethrough.

A gasket-like perimeter spacing element 150 may be arranged at least part way around the periphery of the cut-out 42 on the lower or foil side of the screen 38 thereof. The perimeter spacing element 150 may have a particular thickness, recited as TH1 at a particular location, and in the embodiment shown, at its mid-point. At other locations along the perimeter spacing element 150, the thickness thereof may be less than the thickness at the midpoint, designated at this location as TH2. The thicknes of the spacing element may taper to a thinner dimension or taper to a point at its end, designated here at its ends, as TH3. This spacing element 150 acts as a wall or partition to better keep powder swept through the cut-out 42 to its particular configuration "C". The spacing element 150 also permits the powder to be applied at those particular thicknesses TH1, TH2, TH3, etc. at those particular locations or points on the periphery of the cut-out 42, and permits the thickness of the powder applied to taper down accordingly, providing a scarf edge "E" when used with a shim "S" on a lower support plate 82, along that/those portion(s) of the cut-out 42 without any spacing element 150 which otherwise keeps the stencil 26 from the surface of the receiving belt. The desired thickness/taper of the fused powder product to be applied to the substrate of shoe upper determines the desired thickness of the spacing element 150 along its respective portions. The spacing element 150 may otherwise be of uniform thickness along its entire length, and the spacing element 150 may also be disposed around the entire periphery of the cut-out, if the final product is to be of uniform thickness thereacross.

A plurality of standoff elements 160 may be spacedly arranged on the foil or bottom side of the stencil 38, away from the periphery of the cut-out 42 preferably spaced from that portion of the cut-out without any spacing element 150 as shown move clearly in FIG. 1A. The stand-off elements 160 can be placed anywhere necessary on the bottom side of the stencil 26 away from the cut-out 42, to minimize any wind or vacuum which might occur there. The stand-off elements 160 may be "button" shaped pieces of rubber or plastic which may be arranged to provide a gap between one another as well as between the bottom of the stencil 26 and the receiving belt 20, so that when the stencil means 26 is raised from the receiving belt 20 after the powder "C" has been configured thereon, no sudden irregular rush of air will disturb that configuration.

An alternative form of the spacer element 150 comprises a plurality of individual spacing elements 170 which at least partially surround the cut-out 42 as shown in FIG. 2. The individual spacing element 170 may be likewise of different thicknesses as they approached the ends of their array, or they each may be of the same thickness all the way around the cut-out. This may be the preferred arrangement when the configuration of powder "C" is to be used for collar reinforcement or cloth-type applications. It is to be noted, that if the powder configuration is intended to be used for collars or the like, the cut-out would not necessarily be shaped as shown in the figures, but would be of some other shape more adaptable to the shape of the substrate and its' needs. The thicknesses of the individual spacing elements 170 may also conform to the thicknesses of the perimeter spacing element 150 at their appropriate locations on the periphery of the cut-out 42.

Thus, when the stencil means 26 is raised slowly (at first at least, as discussed in the above referenced co-pending application), from the receiving belt 20 with its' three dimensional configuration of powder "C" thereon, the air does not rush in and disturb the powder because of the channels of air which pre-existed between the adjacent standoff elements 160 to let an orderly flow of air therethrough. The powder may then be transported on its low thermal mass receiving surface, to subsequent work stations for heating/melting-/fusing and subsequent joining with any desired substrate.

In the use of the stencil for producing reinforcement/stiffening or decorative items for use with a substrate, particularly a shoe upper, certain powders and apparatus characteristics are exemplified by the following examples:

(A) A preferred utilization of the present invention comprises the reinforcement of stiffening of a shoe upper. A 35–50 mesh ionomer powder of the sodium cation type having: a melt index of 2.5, a flexural modulus of 51,000 psi, a heat softening temperature (Vicat) 63°0 C., with no additives. A cut-out in the planar surfaces, the overlay and the underlay, are prepared to the particular shape desired and placed on an 8 mesh screen woven from 0.015 inch stainless steel wire. The choice of an 8 mesh screen represents a balance of opposing factors:

a - fine mesh produces a smooth action to the wiper blades;
b - too thick a screen wire size makes the scarf or taper edge too thick;
c - coarse, small diameter wire mesh presents less surface for residual powder particles to cling to or bridge across.

Spacer means on the bottom of the stencil are utilized for an approximately 0.040 inch thick fused product. Considering the bulk density and flow behavior of the powder, a 0.100 inch thick peripheral gasket is used on the bottom side of the stencil means. The scarf shim "S", shown and described in the aforementioned co-pending application, on the lower support surface is adjusted thereon so as to distort the "no-spacer means" portion of the receiving belt into contact with the bottom surface of the stencil means as to provide a proper (desired) taper on the powder applied on the receiving belt and within the confines of the peripheral gasket.

After manufacture of a configuration of powder by the stencil apparatus, the powder is transferred to a heating station, the lower heating units are set for about 490° F. Each radiant heater as shown in the aforementioned application, above the receiving belt is set for a 600° F. surface temperature.

The deposition mechanism is actuated to allow an overall time of about 25 seconds for fusing the powder on the receiving belt, at which time, the product is transferred to the final station for application to the substrate, here the bottom of a shoe upper, then chilled a the chill plate as it is pressed thereagainst which plate is shown in the aforementioned application.

The final product for a box toe shoe upper is tapered from 0.012 inches thick at its scarf edge, to 0.035 inches thick along its full edge.

(b) A further example for use with the stencil apparatus includes the preferred utilization above-described, having as additions in the powder 0.3% polyalkoxy tertiary amine as an antistatic agent, and 0.3% fine silica as a dryer and flow promotor, resulting in less residual powder on the screen and less electrostatic motion of the powder particles during the deposition process, as well as having the printed pattern of a higher quality. The product here may be 0.040 inches thick at its full edge.

(c) A still further example includes the earlier described preferred composition (A) having as its additives: 0.05% conductive furnace black. The deposition behavior, flow behavior and product pattern are similar to example (B). The time for fusion at the heating station may be reduced here, to about 20 seconds, having a product thickness of about 0.040 inches.

(D) For a flexible box toe for mens' or womens' shoes, a 35 mesh low density polyethylene powder may be used, having a melt index of 22, a flexural modulus of 19,000 psi, a heat softening temperature (Vicat) of 83° C. with additives. The lower heating block is raised to a temperature of about 400° F., the upper radiant heater at about 500° F. for a tapered product from about 0.012 to 0.035 inches and a heating (fusion) time of about 18 seconds.

(E) For a soft box toe for slippers, womens' and some childrens' shoes, a 35 mesh ethylene vinyl acetate copolymer, having a melt index of 9, a flexural modulus of about 13,500 psi and a heat softening temp. of about 59° C. The machine conditions are the same as those for example (D), in a heating (fusing) time of 12 seconds producing a tapered product of from about 0.012 to 0.035 inches thick.

(F) If the apparatus is to be used for throat reinforcement, eyelet stay or topline reinforcement for a shoe upper, then the preferred powder is 100 mesh nylon 12 and 0.3% polyalkoxy tertiary amine. The stencil screen would be of about 30 mesh size. This particular product is not tapered, therefore the gasket is arranged about the entire periphery of the cut-out, and is of uniform thickness, of the type of "dot" spacers 0.040 inches thick, as shown in FIG. 2. utilizing machine conditions as in example A, with a heating time of 12 seconds and a print pattern thickness of 0.017 inches.

(G) A thin film reinforcement similar to example F wherein a 100 mesh vinyl powder and 0.3% polyalkoxy tertiary amine powder is used, with a heat stabilizer if desired, having the same deposition means, conditions and results as in the previous example.

We claim:

1. A deposition means for allowing a configuration of fusible powdered material to be deposited on a receiving surface in desired thickness, said deposition means comprising:
   an non-permeable planar surface arrangement;
   a screen member arranged with said planar surface arrangement;
   a cut-out pattern disposed in said planar surface arrangement; and a spacing means of non-uniform thickness disposed on the bottom side of said planar surface arrangement, to permit said planar surface arrangement to be spaced from said receiving surface during deposition of powdered material thereon.

2. A deposition for allowing a configuration of fusible powdered material to be deposited on a receiving surface thereunder, as recited in claim 1, wherein said planar surface arrangement comprises a smooth non-permeable upper surface and a thin lowermost foil surface which sandwich said screen member therebetween.

3. A deposition means for allowing a configuration of fusible powdered material to be deposited on a receiving surface thereunder, as recited in claim 1, wherein said spacing means comprises a gasket member which defines at least part of the perimeter of said cut-out on said lowermost surface.

4. A deposition means for allowing a configuration of fusible powdered material to be deposited on a receiving surface thereunder, as recited in claim 3, wherein said gasket is contactable with said receiving surface.

5. A deposition means for allowing a configuration of fusible powder to be deposited on a receiving surface thereunder, as recited in claim 4, wherein said gasket is predominantly of uniform thickness.

6. A deposition means for allowing a configuration of fusible powdered material to be deposited on a receiving surface thereunder, as recited in claim 4, wherein said deposition thereon is temporary.

7. A deposition means for allowing a configuration of fusible powdered materials to be deposited on a receiving surface thereunder, as recited in claim 5, wherein said gasket is thickest at its mid-point and tapers to thinner thicknesses at its ends.

8. A deposition means for allowing a configuration of fusible powdered material to be deposited on a receiving surface thereunder as recited in claim 5, including:
   a plurality of stand-off elements disposed on the bottom surface of said planar surface which elements are in abuttable contact with said receiving surface, said stand-off elements being spaced from said cut-out and arrange on the bottom or screen side thereof, to prevent said powder from being disturbed by passage of high velocity air therepast upon displacement of said planar surface from said receiving surface.

9. A deposition means for allowing a configuration of fusible powdered material to be deposited on a receiving surface thereunder, as recited in claim 6, wherein said gasket comprises a plurality of individual spacer elements adjacent at least a portion of said cut-out.

10. A deposition apparatus for depositing a configuration of fusible powder of tapering thickness onto a receiving surface, comprising:
    a non-permeable planar surface arrangement;
    a screen member arranged with said planar surface arrangement;
    a cut-out pattern disposed in said planar surface arrangement; and
    a spacing means disposed about the cut-out pattern on the bottom side of said planar surface, said spacing means being configured to conform to the desired tapering thickness of any powder to be applied thereadjacent so as to hold said planar surface and said receiving surface apart to receive the powder thereinbetween.

11. A desposition apparatus as recited in claim 10, wherein said spacing means comprises a strip of material which is arranged to conform to at least part of the periphery of said cut-out on said planar surface, said strip of material being of varying thickness.

12. A deposition apparatus as recited in claim 11, wherein said strip of material tapers from the thickest portion near its middle to thin portions near its ends.

13. A deposition apparatus as recited in claim 10, wherein said spacing means comprises a plurality of individual spacing elements disposed about the periphery of said cut-out.

14. A deposition apparatus as recited in claim 13, wherein said individual spacing elements may be of varying thicknesses from one another, tapering to their thinnest proportions towards the ends of their configurations.

* * * * *